United States Patent
Van Baelen

(10) Patent No.: US 11,474,297 B2
(45) Date of Patent: Oct. 18, 2022

(54) FIBER SPLITTER AND CONNECTION MODULE

(71) Applicant: COMMSCOPE CONNECTIVITY BELGIUM BVBA, Kessel-Lo (BE)

(72) Inventor: David Jan Irma Van Baelen, Winksele (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 17/146,006

(22) Filed: Jan. 11, 2021

(65) Prior Publication Data

US 2021/0255391 A1 Aug. 19, 2021

Related U.S. Application Data

(63) Continuation of application No. 16/316,274, filed as application No. PCT/EP2017/067298 on Jul. 10, 2017, now Pat. No. 10,890,716.

(60) Provisional application No. 62/360,026, filed on Jul. 8, 2016.

(51) Int. Cl.
*G02B 6/28* (2006.01)
*G02B 6/44* (2006.01)

(52) U.S. Cl.
CPC ............ *G02B 6/28* (2013.01); *G02B 6/4471* (2013.01)

(58) Field of Classification Search
None
See application file for complete search history.

(56) References Cited

U.S. PATENT DOCUMENTS

| | | | |
|---|---|---|---|
| 9,348,096 B2* | 5/2016 | Kmit | H04B 10/27 |
| 9,557,498 B2* | 1/2017 | Loeffelholz | G02B 6/3895 |
| 9,841,569 B2 | 12/2017 | Kmit et al. | |
| 10,281,660 B2 | 5/2019 | Loeffelholz | |
| 10,890,716 B2* | 1/2021 | Van Baelen | G02B 6/28 |
| 2008/0298748 A1* | 12/2008 | Cox | G02B 6/30 385/46 |
| 2012/0027339 A1* | 2/2012 | Mathai | G02B 6/125 385/14 |

(Continued)

FOREIGN PATENT DOCUMENTS

| | | |
|---|---|---|
| EP | 1 944 886 A1 | 7/2008 |
| WO | 2011/057811 A2 | 5/2011 |
| WO | 2018/007649 A1 | 1/2018 |

OTHER PUBLICATIONS

International Search Report and Written Opinion of the International Searching Authority for International Patent Application No. PCT/EP2017/067298 dated Sep. 25, 2017, 13 pages.

(Continued)

*Primary Examiner* — Jerry Rahll
(74) *Attorney, Agent, or Firm* — Merchant & Gould P.C.

(57) ABSTRACT

A fiber optic splitter arrangement includes a housing defining a non-enterable interior; at least one optical power splitter disposed within the non-enterable interior; an input port carried by the housing; and a multi-fiber connection port carried by the housing. The input port and/or the multi-fiber connection port may be attached directly to the housing. Output fibers of more than one optical power splitter disposed within the non-enterable interior may be routed to the same multi-fiber connection port. Output fibers of a single optical power splitter may be routed to multiple multi-fiber connection ports.

20 Claims, 15 Drawing Sheets

(56) References Cited

U.S. PATENT DOCUMENTS

2015/0016788 A1* 1/2015 Buff .................... G02B 6/4475
   385/100
2017/0235065 A1 8/2017 Loeffelholz
2018/0164514 A1 6/2018 Kmit et al.

OTHER PUBLICATIONS

Communication for European Patent Application No. 17739243.8 dated May 15, 2020 (5 pgs).

* cited by examiner

FIBER SPLITTER AND CONNECTION MODULE

CROSS-REFERENCE TO RELATED APPLICATION

This application is a Continuation of U.S. patent application Ser. No. 16/316,274, filed on Jan. 8, 2019, now U.S. Pat. No. 10,890,716, which is a National Stage Application of PCT/EP2017/067298, filed on Jul. 10, 2017, which claims the benefit of U.S. Patent Application Ser. No. 62/360,026, filed on Jul. 8, 2016, the disclosures of which is incorporated herein by reference in their entireties. To the extent appropriate, a claim of priority is made to each of the above disclosed applications.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. Optical signals can be split at various points along the network (e.g., at fiber distribution hubs, at drop terminals, etc.). Splitter output pigtails can then be routed to termination fields to connect subscriber lines to the network. Improvements are desired.

SUMMARY

Some aspects of the disclosure are directed to a fiber optic splitter arrangement including optical power splitters disposed within the interior of a housing; and a multi-fiber connector terminating distal ends of at least some of the splitter outputs of each of at least two of the optical power splitters.

In certain examples, the housing defines an interior, at least one input, and at least one output.

In certain examples, each optical power splitter has a separate splitter input.

In certain examples, each optical power splitter has a plurality of splitter outputs.

In certain examples, each of the optical power splitters is configured to split optical signals carried over a fiber received at the splitter input onto the respective splitter outputs.

In certain implementations, the multi-fiber connector terminates the distal ends of all of the splitter outputs of the at least two of the optical power splitters.

In certain implementations, the multi-fiber connector terminates the distal ends of at least some of the splitter outputs of all of the optical power splitters.

In certain implementations, the multi-fiber connector terminates the distal ends of all of the splitter outputs of all of the optical power splitters.

In certain implementations, the at least one output of the housing defines a multi-fiber port. The multi-fiber connector is routed within the interior of the housing to the multi-fiber port.

In certain implementations, the multi-fiber connector is external of the housing so that the splitter outputs terminated by the multi-fiber connector form a stub cable extending from the housing.

In certain implementations, the multi-fiber connector is one of a plurality of multi-fiber connectors, the multi-fiber connectors terminating distal ends of the splitter outputs.

In certain implementations, each of the multi-fiber connectors receives at least some of the splitter outputs from each optical power splitter.

In certain implementations, each of the multi-fiber connectors receives the splitter outputs of respective ones of the optical power splitters.

In certain implementations, each of the multi-fiber connectors receives at least some of the splitter outputs from at least some of the optical power splitters.

Other aspects of the disclosure are directed to a fiber optic splitter arrangement including a housing defining a non-enterable interior, an optical power splitter disposed within the non-enterable interior, an input port carried by the housing, and a multi-fiber connection port carried by the housing. The optical power splitter includes a splitter input and a plurality of splitter outputs. An input line extends into the non-enterable interior of the housing through the input port. The input line is optically coupled to the splitter input. Optical fibers extend from the splitter outputs to the multi-fiber connection port so that optical signals carried by the optical fibers are optically accessible through the multi-fiber connection port.

In certain implementations, the multi-fiber connection port is defined by the housing.

In certain implementations, the multi-fiber connection port is defined at a free end of a stub cable extending outwardly from the housing.

In certain implementations, the input port is an aperture defined by the housing and the input line includes an optical fiber that extends through the aperture to a free end disposed outside of the housing.

In some examples, the free end of the optical fiber is terminated by a fiber optic connector. In other examples, the free end of the optical fiber is unterminated.

In certain implementations, the input port is an exterior port of an optical adapter carried by the housing; and the input line includes an optical fiber that extends from the splitter input to an interior port of the optical adapter, the interior port being aligned with the exterior port.

In certain examples, the optical adapter is at least partially disposed within the housing. In certain examples, the input port is an LC port. In certain examples, the input port is an SC port. In certain examples, the input port is a duplex port. In certain examples, the input port is a triplex port. In certain implementations, the input port is a quadruplex port.

In certain implementations, the optical power splitter is one of a plurality of optical power splitters disposed within the non-enterable interior. Each optical power splitter includes a respective splitter input and a respective plurality of splitter outputs.

In certain examples, the input line is one of a plurality of input lines extending into the non-enterable enclosure through the input port.

In certain examples, all of the splitter outputs are optically accessible from the multi-fiber connection port. In certain examples, the plurality of optical power splitters includes two optical power splitters. In certain examples, the plurality of optical power splitters includes three optical power splitters. In certain examples, the plurality of optical power splitters includes four optical power splitters.

In certain examples, the multi-fiber connection port defines twelve fiber positions. In certain examples, the multi-fiber connection port defines twenty-four fiber positions.

In certain implementations, any optical connections between the input line and the optical power splitter are permanent.

In certain implementations, any optical connections between the optical power splitter and the multi-fiber connection port are permanent.

In certain implementations, the housing extends along a length between first and second ends. The multi-fiber connection port is carried by the first end, and wherein the multi-fiber connection port is at least a tenth the size of the first end.

In certain examples, the length of the housing in the largest dimension of the housing.

In certain implementations, an enterable enclosure defines an interior in which the housing can be disposed. The enterable enclosure defines a cable port sized to receive a multi-fiber cable. A multi-fiber connector terminating the multi-fiber cable plugs into the multi-fiber connection port within the enterable enclosure. Closing the enterable enclosure inhibits access to the multi-fiber connector.

In certain implementations, the enterable enclosure includes a base and a cover that cooperate to define the interior of the enterable enclosure. In some examples, the cover is removable from the base. In other examples, the cover pivots relative to the base between open and closed positions.

In certain implementations, the enterable enclosure defines bend radius protection at the cable port.

In certain implementations, a splice tray includes a splice mounting location and a module mounting location. The housing of the splitter arrangement is disposed at the module mounting location so that the multi-fiber connection port is accessible from an exterior of the splice tray. The input line is routed to the splice mounting location.

In certain implementations, the housing of the splitter arrangement is disposed within a fiber distribution hub.

In certain implementations, the housing of the splitter arrangement is disposed in a wall of a multi-dwelling unit.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
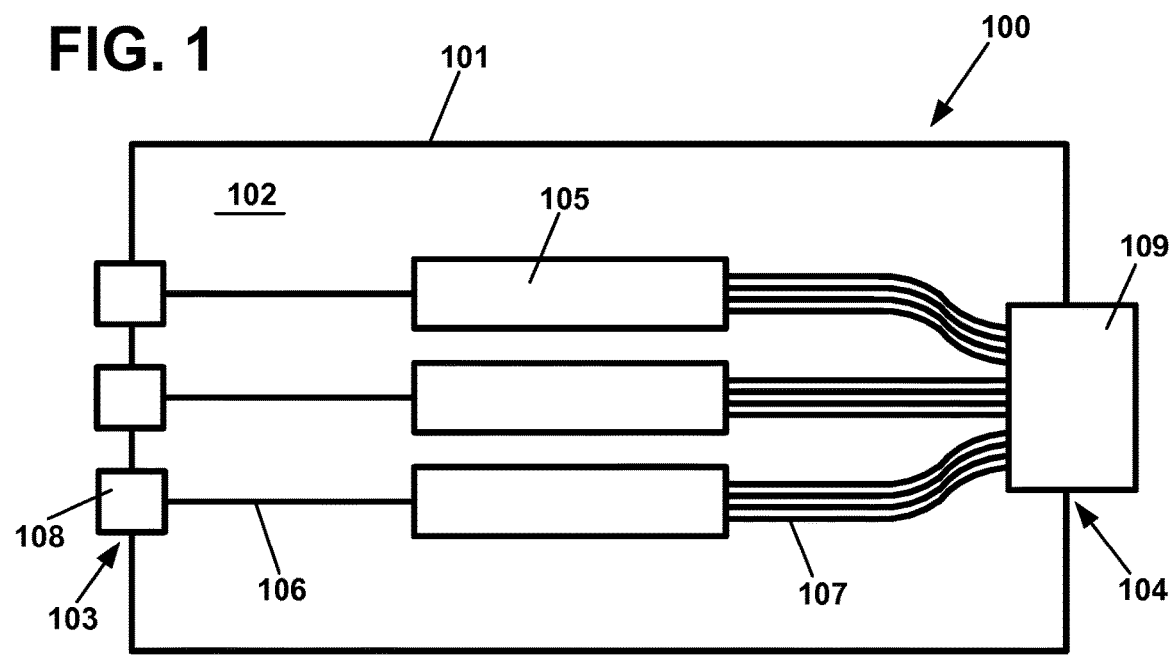
FIG. 1 is a schematic diagram of an example splitter arrangement including an optical power splitter disposed within a non-enterable interior of a housing to which one or more inputs and one or more outputs are directly connected.

Reference will now be made in detail to the exemplary aspects of the present disclosure that are illustrated in the accompanying drawings. Wherever possible, the same reference numbers will be used throughout the drawings to refer to the same or like structure.

In general, the disclosure is directed to a device including a housing defining a non-enterable interior. As the term is used herein, a non-enterable interior refers to an interior that is fully surrounded by the housing and is not intended to be accessed by a user during normal operation of the device. As the term is used herein, "normal operation" refers to the intended operation of the device from initial deployment until removal. Accordingly, a device having a housing with a non-enterable interior is a device that is not intended to be accessed by a person (e.g., an owner, a service technician, etc.) during the life of the device.

In certain examples, the housing does not include features that facilitate access to the interior. In certain examples, the housing is designed to inhibit access to the interior by the user. In an example, the housing may be configured so that the user cannot access the interior without breaking the housing. For example, the housing may be sonically welded or latched by hidden latch features. In other examples, however, the housing may be closed by one or more fasteners (e.g., screws). In certain examples, the fastener can be adhesively held in place. The term "non-enterable" does not indicate that fibers or other cabling structures do not extend into the interior. However, these cabling structures are routed into the interior and all connections within the interior are made prior to deployment of the device. The non-enterability of the housing interior begins after the housing is manufactured and prior to deployment of the housing.

The device has an input and an output carried by the housing. As the term is used herein, "carried by the housing" means that the input and output are operably coupled to the housing so that transporting the housing leads to transporting the input and output. In some implementations, the input and/or output are directly connected to the housing. For example, the input and/or output can be defined by a connector or by a port of an optical adapter directly held by the housing. In other implementations, the input and/or output are defined at the free end of fibers/cables extending outwardly from the housing. For example, the input can be defined by a connector or by a port of an optical adapter at the free end of a stub cable.

In some implementations, the input of the device has multiple input locations. For example, multiple input ports can be defined at the housing. In another example, multiple input connectors can be attached to the housing. In another example, multiple fiber ports can be defined in the housing.

The output of the device is a multi-fiber output. In some examples, the output is a multi-fiber connector. In other examples, the output is a port of a multi-fiber adapter. In other examples, the output is a free end of an unterminated multi-fiber cable. In some implementations, the output of the device is separated into multiple output locations. For example, multiple output ports can be defined at the housing. In such implementations, at least one of the output locations is a multi-fiber output. In preferred implementations, each of the output locations is a multi-fiber output.

An optical power splitter is disposed within the non-enterable interior. The optical power splitter has a splitter input and a plurality of splitter outputs. The optical power splitter is configured to split an optical signal received at the splitter input onto the splitter outputs. The splitter input is optically coupled to the input carried by the housing. The splitter outputs are optically coupled to the multi-fiber output carried by the device. In some implementations, the splitter outputs can be routed to multiple output locations. In other implementations, the splitter outputs of multiple optical splitters can be routed to the same output location.

In some implementations, each output receives optical fibers in multiples of twelve. In an example, an output can include a multi-fiber optical connector holding twelve optical fibers. In another example, an output can include a multi-fiber optical connector holding twenty-four optical fibers. In another example, an output can include a multi-fiber optical connector holding ninety-six optical fibers. In another example, an output can include a multi-fiber optical connector holding one hundred forty-four optical fibers. In other examples, the output can include a port of an optical adapter configured to receive any of the above-described multi-fiber optical connectors.

Figure 2:
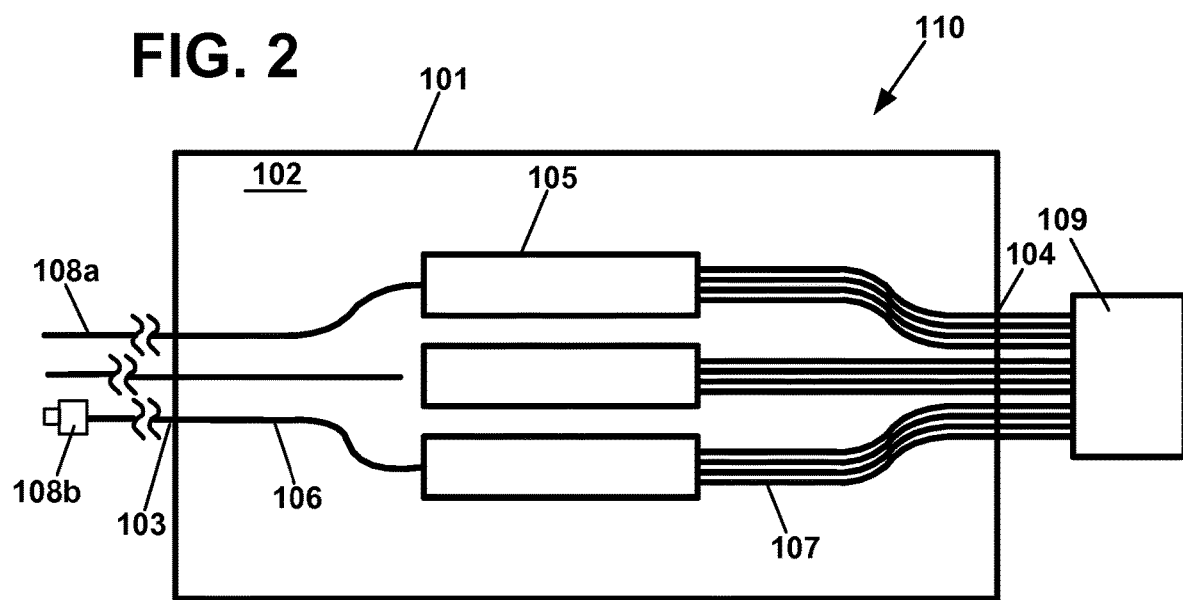
FIG. 2 is a schematic diagram of another example splitter arrangement including an optical power splitter disposed within a non-enterable interior of a housing by which one or more inputs and one or more outputs are carried.

FIGS. 1 and 2 are schematic diagrams illustrating two example implementations of the device. FIG. 1 illustrates a first example splitter arrangement 100 including a housing 101 defining a non-enterable interior 102 to which the input 103 and output 104 are directly attached. At least one passive optical splitter 105 is disposed within the non-enterable interior 102. In the example shown, three passive optical splitters 105 are disposed within the non-enterable interior 102.

In some implementations, a total split ratio of the passive optical splitters 105 is a multiple of 1:12. For example, if three passive optical splitters 105 are present, then each passive optical splitter 105 may have a split ratio of 1:4 (total split ratio of 1:12), 1:8 (total split ratio of 1:24), 1:12 (total split ratio of 1:36), 1:32 (total split ratio of 1:96), 1:48 (total split ratio of 1:144), etc.

In some implementations, one or more single-fiber ports 108 are disposed at the housing input 103. In certain examples, each single-fiber port 108 is accessible from an exterior of the housing 101. Each single-fiber port 108 is configured to receive a single-fiber optical connector (e.g., an LC optical connector, an LX.5 optical connector, an SC optical connector, etc.). In certain implementations, the single-fiber port 108 can be defined by optical adapters. In some implementations, each optical adapter defines one single-fiber port 108. In other implementations, one optical adapter 108 can define multiple single-fiber ports 108. In other implementations, one or more optical connectors (e.g., single-fiber optic connectors) can be disposed at the input 103. In the example shown, the housing input 103 defines three single fiber ports 108. In other examples, the housing input can define any desired number (e.g., 1, 2, 3, 4, 6, 8, etc.) of inputs ports or connectors.

An optical fiber line 106 extends through the housing input 103 to an input of the splitter 105. In examples having multiple input ports 108, a separate optical line 106 extends from each input port 108 to the splitter input. In the example shown, a respective optical fiber 106 extends from each of three single-fiber ports 108 to the splitter input.

A multi-fiber port 109 is disposed at the housing output 104. The multi-fiber port 109 is accessible from an exterior of the housing 101. The multi-fiber port 109 is configured to receive a multi-fiber optical connector (e.g., an MPO connector). In certain implementations, the multi-fiber port 109 can be defined by a multi-fiber optical adapter. In some implementations, the housing output 104 includes multiple multi-fiber ports 109.

Multiple optical fibers 107 extend from the splitter output to the one or more multi-fiber ports 109 at the housing output 104. In the example shown, the splitter output fibers 107 from all of the splitters 105 extend to a common multi-fiber port 109. In other examples, however, the splitter output fibers 107 can extend to multiple multi-fiber ports 109. In certain examples, some of the splitter output fibers 107 of a splitter 105 extend to a first multi-fiber port and others of the splitter output fibers 107 of the splitter 105 extend to a second multi-fiber port.

In one example, the housing holds three 1×8 splitters 105 and the housing output 104 defines two multi-fiber ports. In such an example, all of the splitter outputs of the first splitter 105 extend to the first multi-fiber port. All of the splitter outputs of the third splitter 105 extend to the second multi-fiber port. Four of the splitter outputs of the second splitter 105 extend to the first multi-fiber port and the other four of the splitter outputs of the second splitter 105 extend to the second multi-fiber port.

FIG. 2 illustrates a second example splitter arrangement 110 including a housing 101 defining a non-enterable interior 102. The non-enterable interior 102 is configured the same as the non-enterable interior 102 of FIG. 1 including the one or more passive optical splitters 105 disposed inside. However, the housing input 103 and output 104 define cable ports (e.g., apertures in the housing) through which one or more input lines and one or more output lines extend. Accordingly, the inputs 103 and output 104 of the second example splitter arrangement 110 are carried by the housing 101, but not directly attached to the housing 101.

In the example shown, three input fibers 106 extend into the housing 101 through the input 103. In some implementations, the housing 101 defines three separate apertures that each receive one of the input fibers 106. In other implementations, the housing 101 defines one aperture through which all three of the input fibers 106 extends. In other implementations, a multi-fiber cable may extend through an aperture defined in the housing 101. In some such implementations, the multi-fiber cable is fanned out within the interior 101 so that individual fibers of the multi-fiber cable extend to different splitter inputs.

FIGS. 3-8 illustrate example implementations of the splitter arrangements 100, 110 of FIGS. 1 and 2. Each splitter arrangement includes a housing 101 defining a non-enterable interior. The housing 101 of the splitter arrangement 120 has an input 103 and an output 104.

Figure 3:
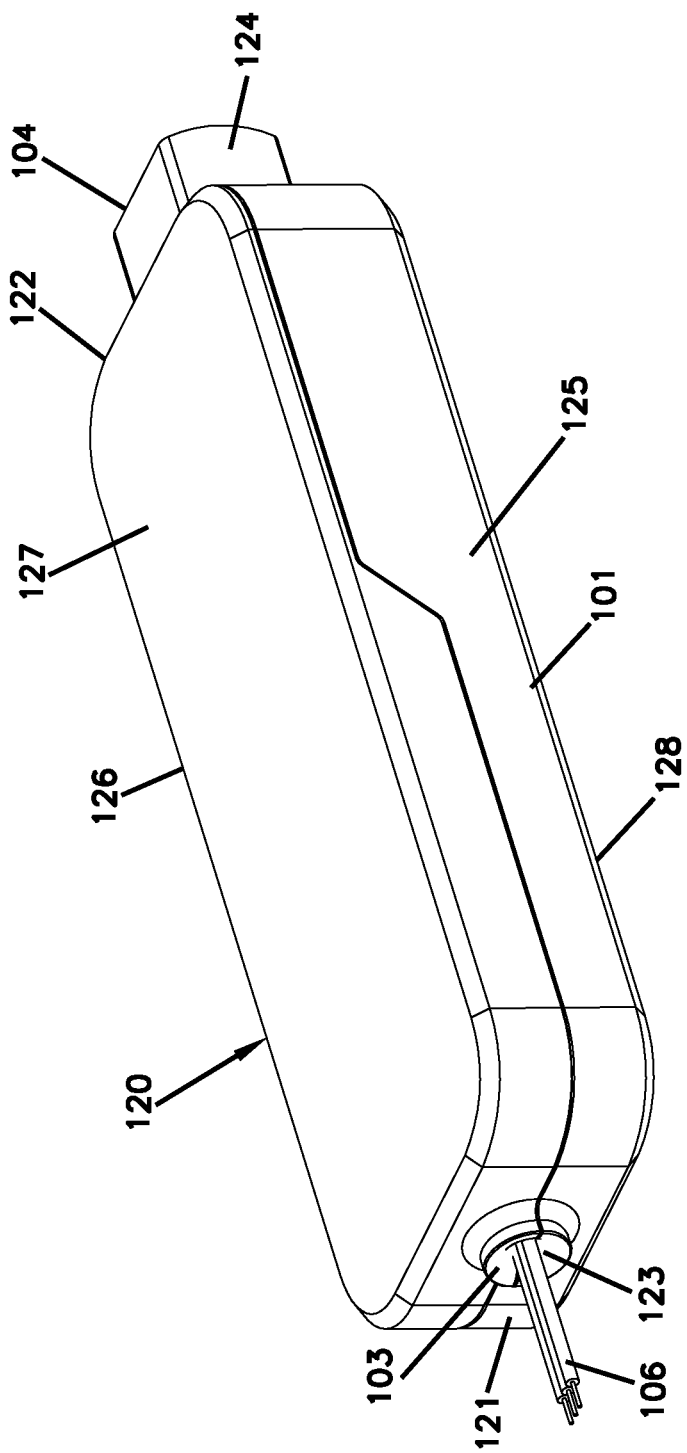
FIG. 3 is a perspective view of an example splitter arrangement including an optical power splitter disposed within a non-enterable interior of a housing defining an input cable port and an output adapter port.

In the example splitter arrangement 120 shown in FIG. 3, the housing 101 extends along a length between first and second axial ends 121, 122. The housing 101 also extends along a width between first and second sides 125, 126 and along a height between a top 127 and a bottom 128. In certain implementations, the length of the housing 101 is larger than the width or the height. In certain implementations, the input 103 and the output 104 face in opposite directions. In the example shown, the input 103 and the output 104 are disposed at the first and second axial ends 121, 122, respectively.

In the example splitter arrangement 120, the input 103 includes a single aperture defined in the housing 101. Three input fibers 106 extend through the single aperture. A bend radius protector inhibits excessive bending of the fibers 106 entering the aperture 103. In other examples, each of the input fibers 106 could enter through a different aperture. In still other examples, each of the input fibers 106 could be terminated by a single-fiber connector coupled to the first axial end 121 of the housing 101.

In the example shown, the output 104 includes a projection 124 defining an exteriorly accessible multi-fiber port. In some implementations, the projection 124 is integrally formed with the housing 101. In other implementations, the projection 124 is a separate piece held by the housing 101. In certain implementations, the projection 124 includes retention structures (e.g., latches) configured to hold a multi-fiber connector to the multi-fiber port. In certain implementations, the projection 124 is part of a multi-fiber optical adapter (e.g., an MPO adapter).

Figure 4:
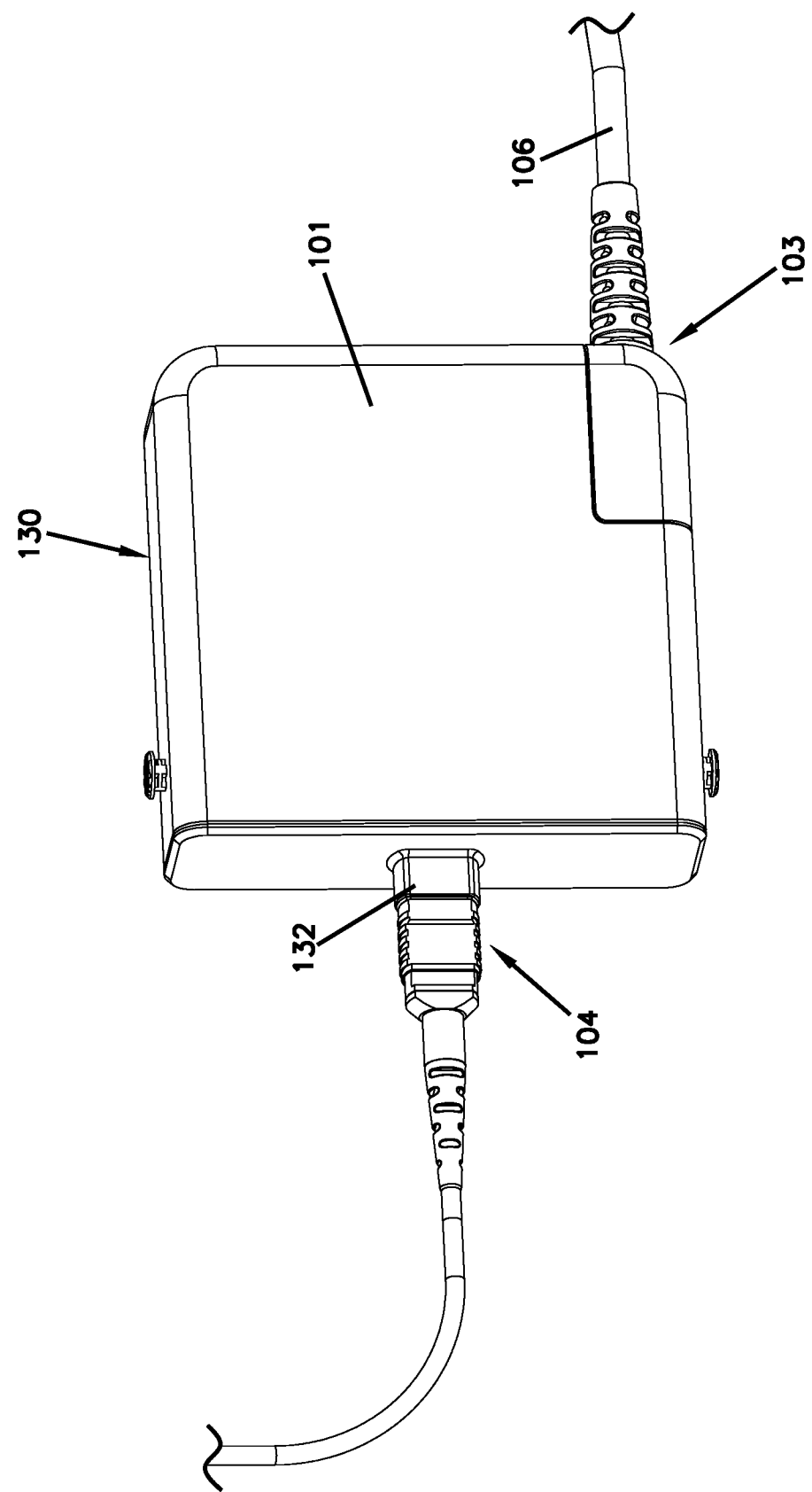
FIG. 4 is a perspective view of another example splitter arrangement including an optical power splitter disposed within a non-enterable interior of a housing defining an input cable port and an output adapter port.

FIG. 4 illustrates another example splitter arrangement 130 including a housing 101 defining a non-enterable interior 102 holding one or more optical splitters. In certain implementations, the housing 101 is generally square shaped. In certain examples, the input 103 includes an aperture sized to receive a single optical fiber 106. In the example shown, the output 104 includes a projection 132 extending from the housing 101 to define a multi-fiber port. In some examples, the projection 132 is part of a multi-fiber optical adapter. In other examples, the projection 132 encloses or holds a multi-fiber optical adapter. In various other examples, the projection 132 can define or hold a multi-fiber optical connector.

Figure 5:
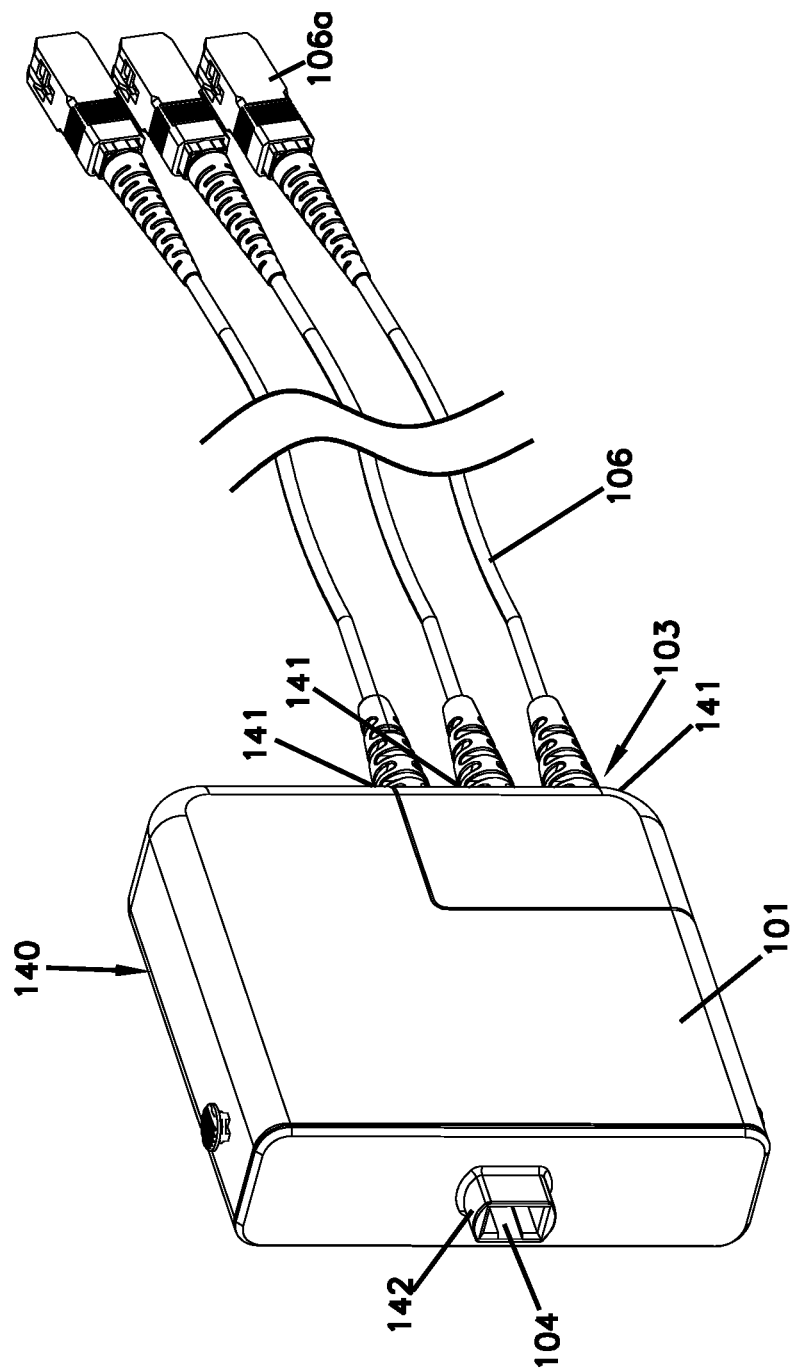
FIG. 5 is a perspective view of the splitter arrangement of FIG. 4 having three input cable ports.

FIG. 5 illustrates another example splitter arrangement 140 including a housing 101 defining a non-enterable interior 102 holding one or more optical splitters. In certain implementations, the housing 101 is generally square shaped. In certain examples, the input 103 includes three separate apertures 141 that each receive one optical fiber 106. In the example shown, free ends of the optical fibers 106 are terminated by single-fiber optical connectors 106a. In other examples, the free ends of the optical fibers 106 can be unterminated. In still other examples, the free ends of the optical fibers 106 can be terminated at one or more multi-fiber connectors. In the example shown, the output 104 includes a projection 142 extending from the housing 101 to define a multi-fiber port. In some examples, the projection 142 is part of a multi-fiber optical adapter. In other examples, the projection 142 encloses or holds a multi-fiber optical adapter. In various other examples, the projection 142 can define or hold a multi-fiber optical connector.

In the example shown, each of the single-fiber ports 143 is configured to receive an LC optical connector. In the example shown, the output 104 includes a projection 142 extending from the housing 101 to define a multi-fiber port. In some examples, the projection 142 is part of a multi-fiber optical adapter. In other examples, the projection 142 encloses or holds a multi-fiber optical adapter. In various other examples, the projection 142 can define or hold a multi-fiber optical connector.

Figure 6:
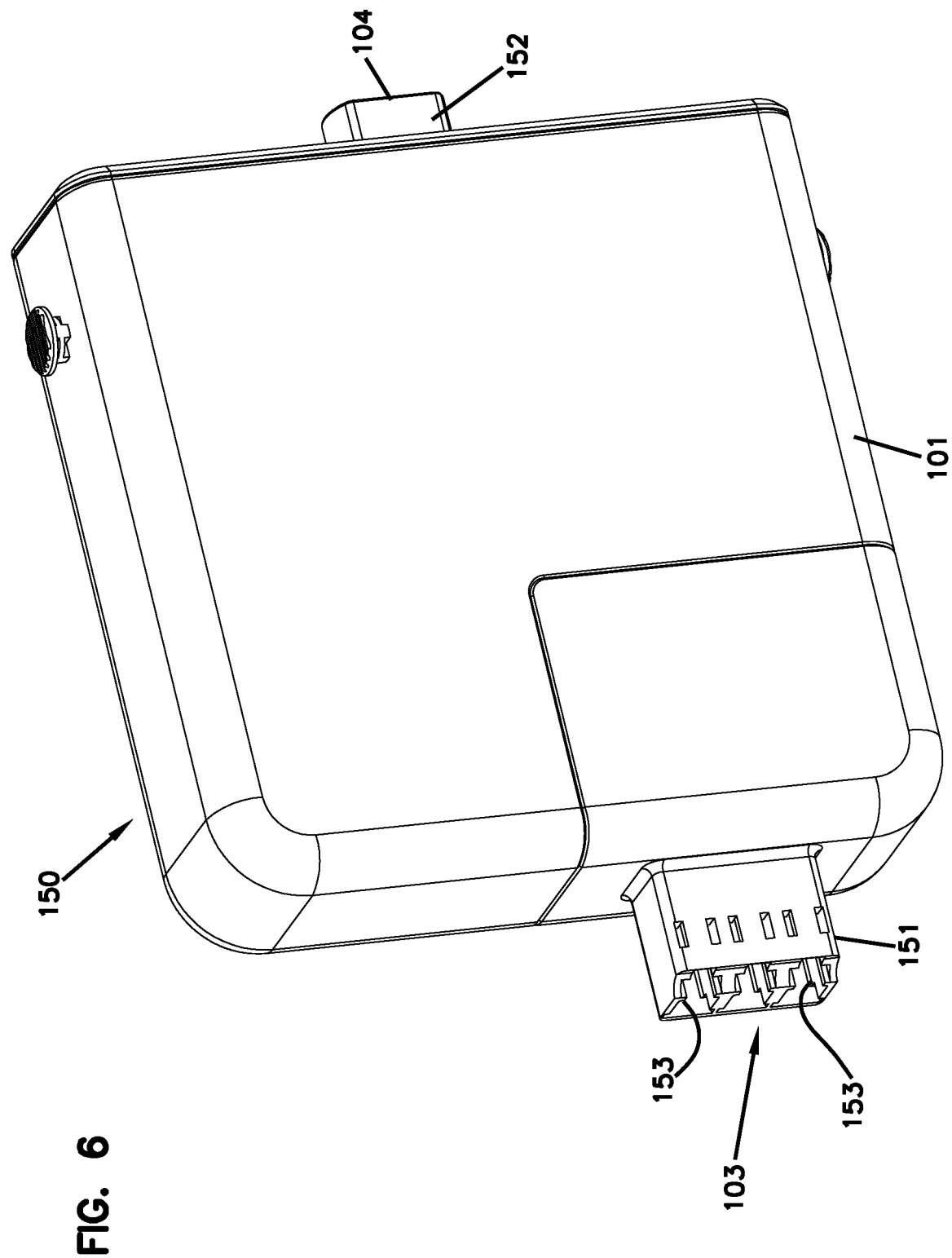
FIG. 6 is a perspective view of the splitter arrangement of FIG. 4 having multiple input adapter ports and an output adapter port.

FIG. 6 illustrates another example splitter arrangement 150 including a housing 101 defining a non-enterable interior 102 holding one or more optical splitters. In certain implementations, the housing 101 is generally square shaped. In certain examples, the input 103 includes a triplex optical adapter 151 that defines three single-fiber ports 153. In the example shown, each of the single-fiber ports 153 is configured to receive an LC optical connector. In the example shown, the output 104 includes a projection 152 extending from the housing 101 to define a multi-fiber port. In some examples, the projection 152 is part of a multi-fiber optical adapter. In other examples, the projection 152 encloses or holds a multi-fiber optical adapter. In various other examples, the projection 152 can define or hold a multi-fiber optical connector.

Figure 7:
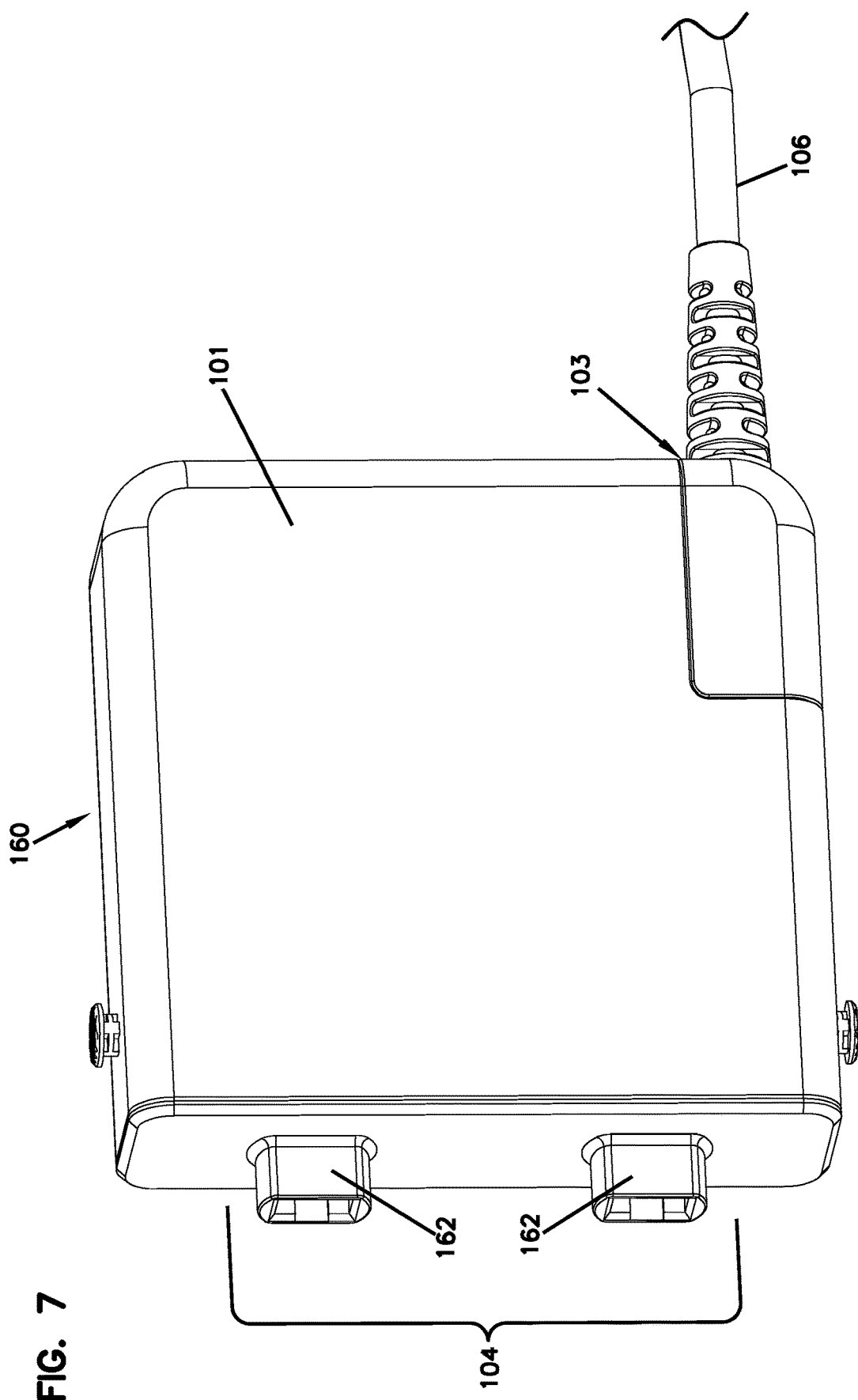
FIG. 7 is a perspective view of the splitter arrangement of FIG. 4 having an input cable port and multiple output adapter ports.

FIG. 7 illustrates another example splitter arrangement 160 including a housing 101 defining a non-enterable interior 102 holding one or more optical splitters. In certain implementations, the housing 101 is generally square shaped. In certain examples, the input 103 includes an aperture sized to receive a single optical fiber 106. In the example shown, the output 104 includes two exteriorly accessible multi-fiber ports. In some implementations, two projections 162 extend from the housing 101 to define the multi-fiber ports. In other implementations, each same projection 162 can define multiple multi-fiber ports. In some examples, the projection 162 is part of a multi-fiber optical adapter. In other examples, each projection 162 encloses or holds a multi-fiber optical adapter. In various other examples, the projection 162 can define or hold a multi-fiber optical connector.

Figure 8:
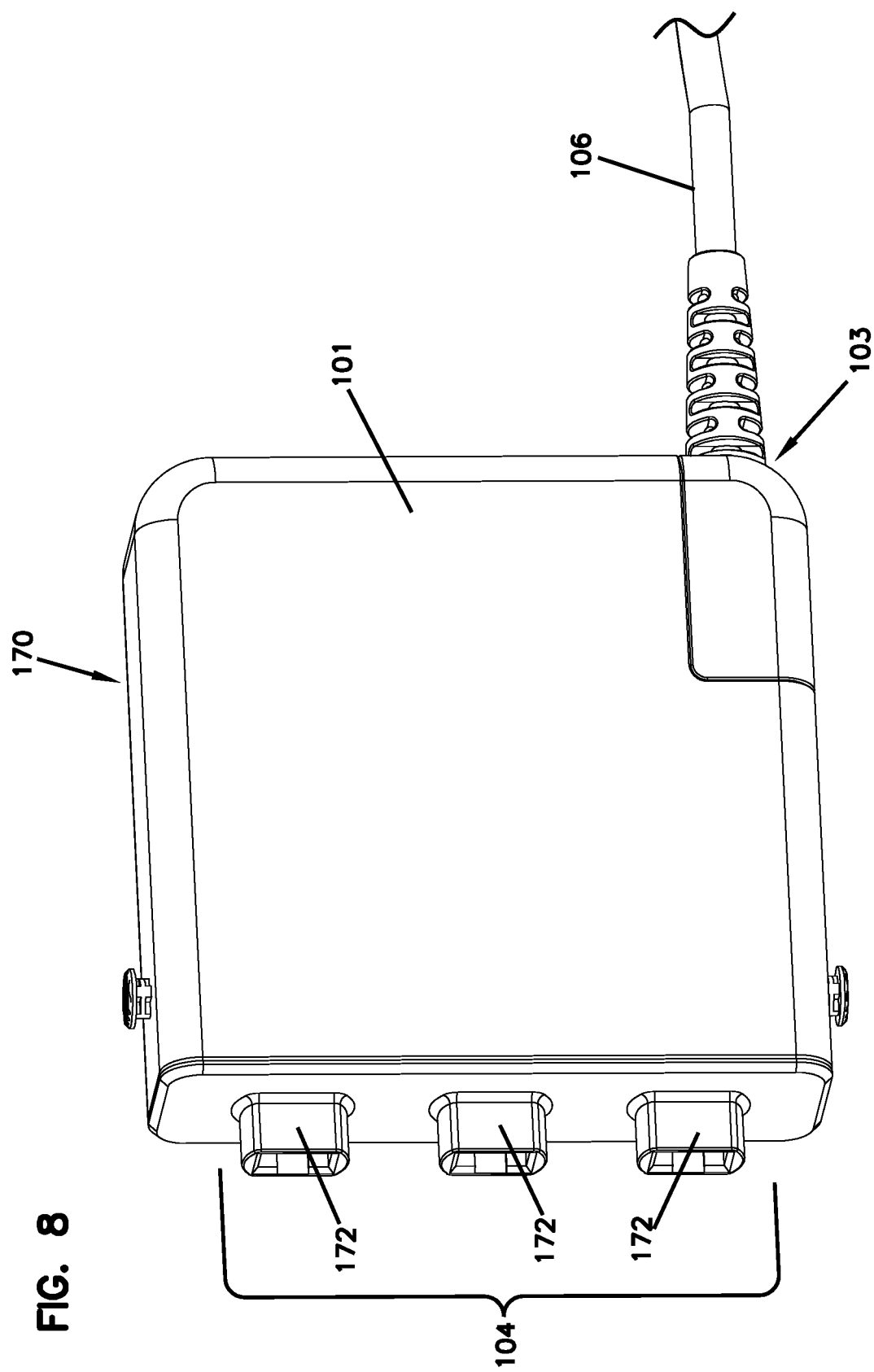
FIG. 8 is a perspective view of the splitter arrangement of FIG. 7 having three output adapter ports.

FIG. 8 illustrates another example splitter arrangement 170 including a housing 101 defining a non-enterable interior 102 holding one or more optical splitters. In certain implementations, the housing 101 is generally square shaped. In certain examples, the input 103 includes an aperture sized to receive a single optical fiber 106. In the example shown, the output 104 includes three exteriorly accessible multi-fiber ports. In some implementations, three projections 172 extend from the housing 101 to define the multi-fiber ports. In other implementations, the same projection 172 can define multiple multi-fiber ports. In some examples, each projection 172 is part of a multi-fiber optical adapter. In other examples, each projection 172 encloses or holds a multi-fiber optical adapter. In various other examples, the projection 172 can define or hold a multi-fiber optical connector.

Figure 9:
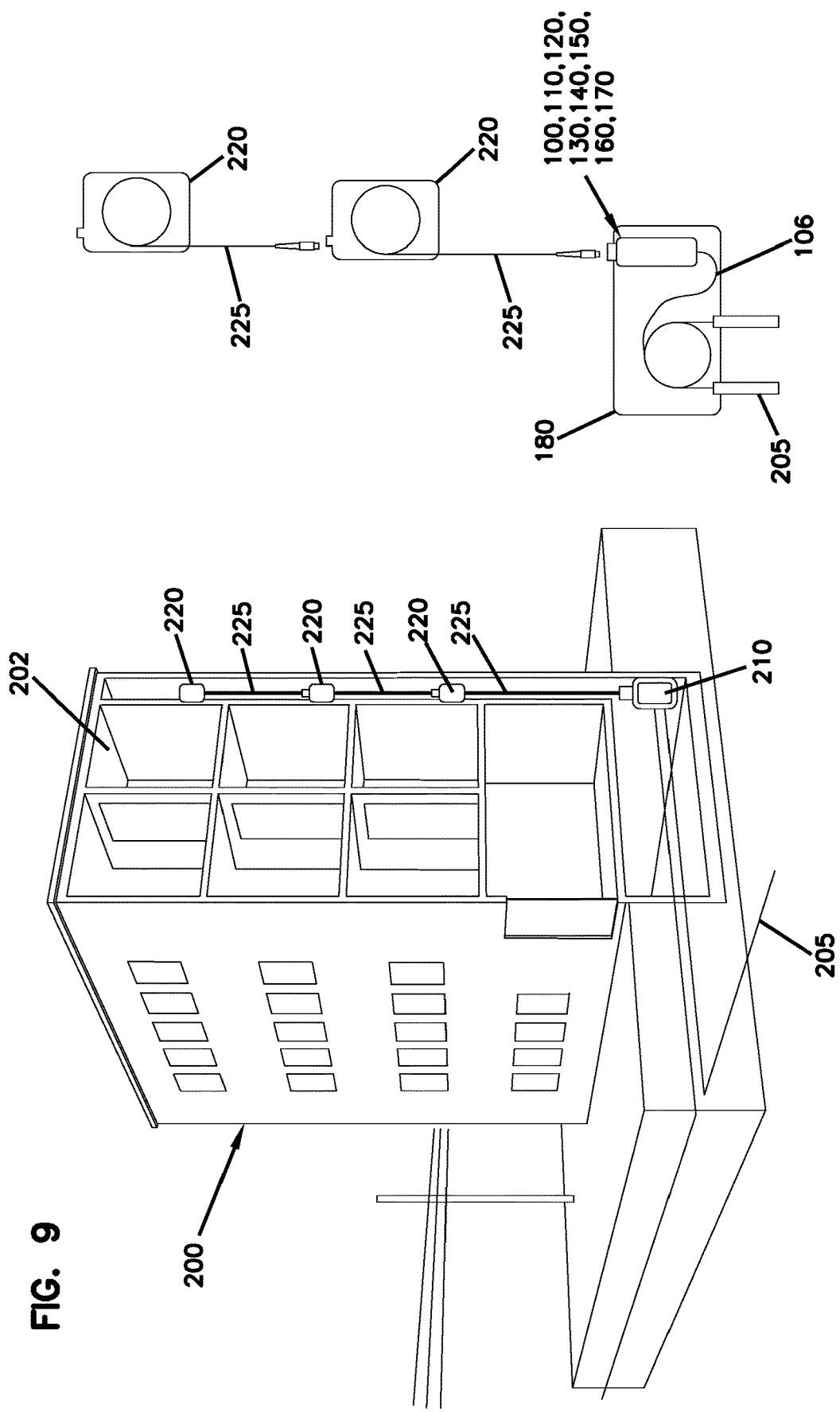
FIG. 9 is a multi-dwelling unit having a local network with any of the splitter arrangements of FIGS. 1-8 providing a connection between the local network and a feeder cable of a passive optical network.
Figure 10:
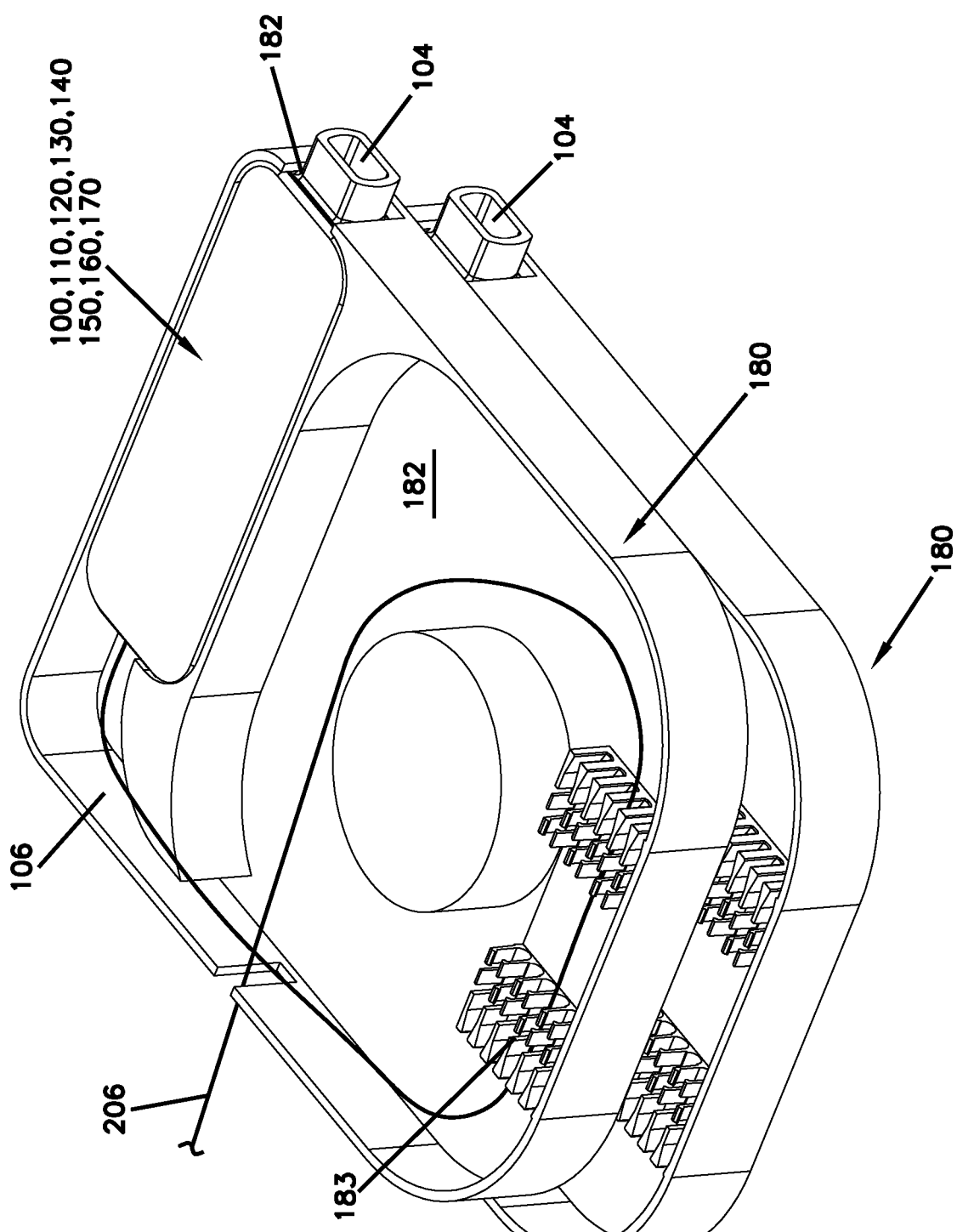
FIG. 10 is a perspective view of example splice trays in which any of the splitter arrangements of FIGS. 1-8 can be disposed to facilitate optical splicing between a feeder cable and an input stub of the splitter arrangement.

FIG. 9 illustrates an example environment in which the splitter arrangement 100, 110, 120, 130, 140, 150, 160, 170 can be utilized. An optical fiber network is routed to a multi-dwelling unit 200 having multiple floors 202. A feeder cable 205 is routed from the optical network to the multi-dwelling unit 200. The feeder cable 205 is received at a distribution point 210 located within the multi-dwelling unit 200. For example, the distribution point 210 can be located in a basement or ground floor of the unit 200. The feeder cable 205 is optically coupled to a local optical network at the distribution point 210. In some examples, the distribution point 210 includes a fiber distribution hub. In other examples, the distribution point 210 includes a splice enclosure.

In the example shown, the feeder cable 205 is routed to a splice tray 180 that also holds a splitter arrangement 100, 110, 120, 130, 140, 150, 160, 170. One or more optical fibers 206 are separated out from the feeder cable 205 and routed to a splice region 183 on the tray. In some implementations, the splitter arrangement 110, 120, 130, 140, 150, 160 include one or more optical fibers 106 extending out from the housing 101. Free ends of the optical fibers 106 also can be routed to the splice region 183 and optically spliced to the optical fibers 206. In other implementations, connectorized stub fibers can plug into input ports 103 of the housing 101 while unterminated ends of the stub fibers are routed to the splice region 183 for connection with the optical fibers 206.

In some implementations, the output 104 of the splitter arrangement 100, 110, 120, 130, 140, 150, 160, 170 is accessible from an exterior of the tray 180. Accordingly, after the splice tray is cabled and installed, the feeder cable 205 can be optically coupled to the local network by routing a multi-fiber cable from the local network to the output 104 of the splitter arrangement 100, 110, 120, 130, 140, 150, 160, 170. In certain examples, the output 104 extends past an outer periphery of the tray 180.

In certain implementations, the tray 183 is stackable within an enclosure. In certain implementations, the tray 183 is hinged to pivot relative to the enclosure and/or other splice trays 183. In some implementations, each tray 183 holds one splitter arrangement 100, 110, 120, 130, 140, 150, 160, 170. In other implementations, each tray 183 can hold multiple splitter arrangements 100, 110, 120, 130, 140, 150, 160, 170.

In certain implementations, the local network may include one or more fiber distribution terminals 220 installed at various floors of the multi-dwelling unit 200. Each fiber distribution terminal 220 includes a multi-fiber cable 225 having a first end terminated by a multi-fiber connector and a second end terminated by one or more optical connectors. The multi-fiber connector end of the cable 225 can be routed to the building distribution point 210 or to another fiber distribution terminal 220 for connection thereto. In certain examples, the cable 225 indexes the optical fibers between the first and second ends of the cable. In certain examples, the cable 225 can be paid out from a cable spool disposed within the fiber distribution terminal 220. Further details pertaining to the fiber distribution terminals, the multi-fiber cables 225, and the local networks of a multi-dwelling unit 200 can be found in U.S. application Ser. No. 15/046,936, filed Feb. 18, 2016; and in U.S. application Ser. No. 62/360,040, filed herewith, and titled "Rapid Deployment Indexing Terminal Arrangement," the disclosures of which are hereby incorporated herein by reference.

Figure 11:
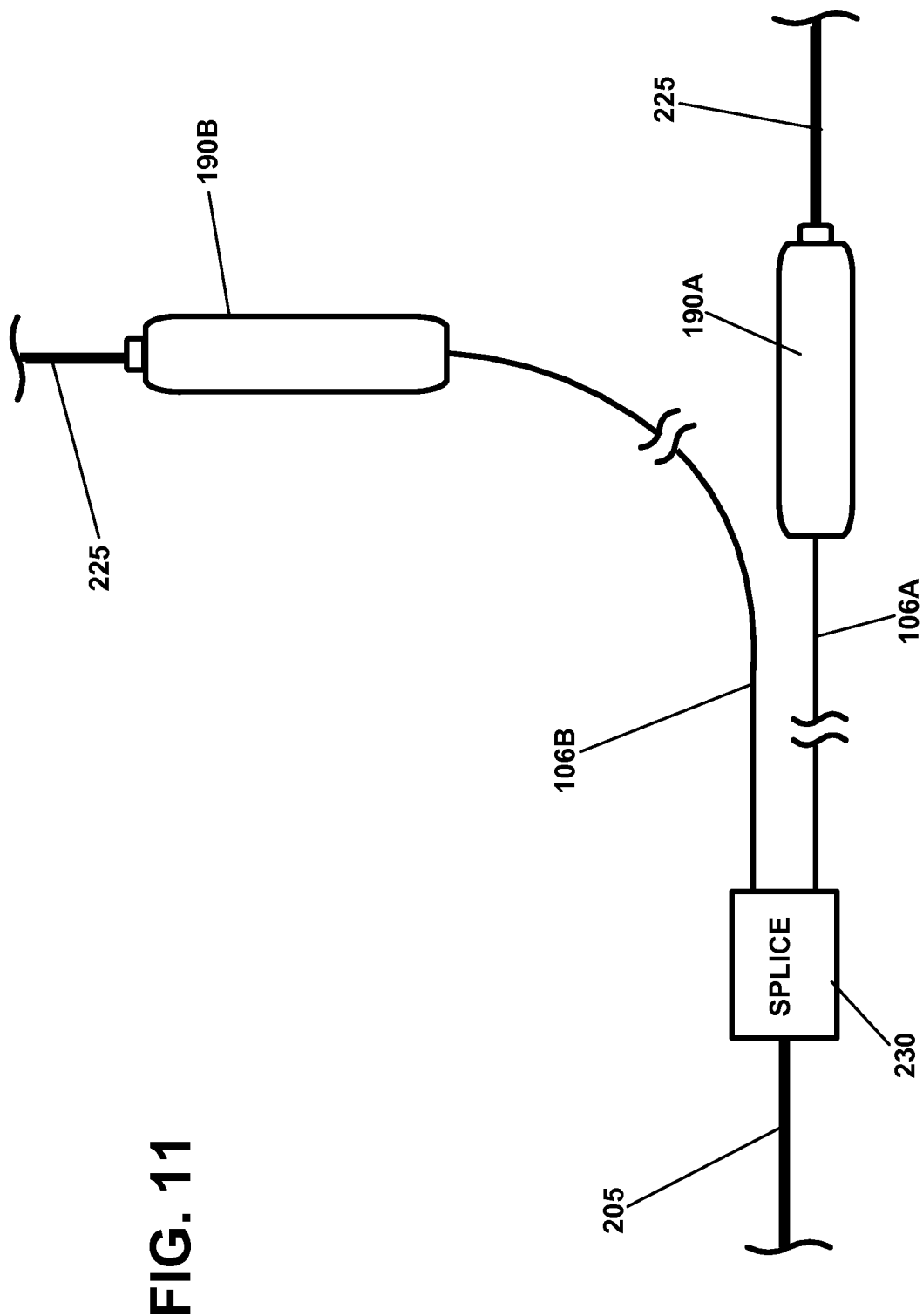
FIG. 11 is a schematic view of multiple splitter arrangements being separately spliced to a feeder cable at a splice location that is remote from any of the splitter arrangements.

As shown in FIG. 11, one or more splitter arrangements 100, 110, 120, 130, 140, 150, 160, 170 can be used without a tray or aggregation closure. Instead, two or more splitter arrangements 100, 110, 120, 130, 140, 150, 160, 170 can be spaced around the multi-dwelling unit 200 (e.g., within a wall or vertical shaft of the multi-dwelling unit 200). In certain implementations, the feeder cable 205 is routed to a splice box 230 at which one or more optical fibers of the feeder cable 205 are spliced to input fibers of one or more splitter arrangements. In the example shown in FIG. 11, input fibers 106A, 106B of first and second splitter arrangements 190A, 190B are spliced to the feeder cable 205 at the splice box 230. Each splitter arrangement 190A, 190B can have any of the various configurations of inputs 103 and outputs 104 described above with reference to splitter arrangements 100, 110, 120, 130, 140, 150, 160, 170.

In some implementations, the first splitter arrangement 190A may be located at a basement, ground floor, or other floor at which the feeder cable 205 is received. A cable 225 of a fiber distribution terminal 220 can be routed to the output 104 of the first splitter arrangement 190A. In other implementations, the first splitter arrangement 190A can be located on the same floor as the fiber distribution terminal 220. In certain examples, the fiber distribution terminal 220 is the start of a first daisy-chain of distribution terminals 220 within the multi-dwelling unit 200.

In some implementations, the second splitter arrangement 190B can be located at a basement, ground floor, or other floor at which the feeder cable 205 is received. In other implementations, the second splitter arrangement 190B can be located at a floor on which a subsequent fiber distribution terminal is received (or at a location between the floor and the splice box 230). A cable 225 of the subsequent fiber distribution terminal 220 is routed to the output 104 of the second splitter arrangement 190B. In certain examples, the subsequent fiber distribution terminal 220 is the start of a second daisy-chain of distribution terminals 220 within the multi-dwelling unit 200.

In accordance with some aspects of the disclosure, it may be desirable to safeguard the connection between the multi-fiber cable (e.g., cable 225 of the fiber distribution terminal 220) and the output 104 of the splitter arrangement 104. Accordingly, the output of the splitter arrangement 190 can be disposed within an outer casing 250. The outer casing 250 defines a re-enterable interior in which the output 104 of the splitter arrangement 190 is disposed. As the term is used herein, a re-enterable interior of a device is an interior that can be accessed during normal operation of the device (i.e., without breaking the device).

The outer casing 250 can be arranged in at least an open configuration and a closed configuration during normal operation. When the casing 250 is arranged in the open configuration, the output 104 of the splitter arrangement 190 is accessible to a user. When the casing 250 is arranged in the closed configuration, the casing 250 inhibits access to the output 104 of the splitter arrangement 190. In some implementations, the outer casing 250 surrounds the entire splitter arrangement 190. In other implementations, the outer casing 250 surrounds only the output 104.

Figure 12:
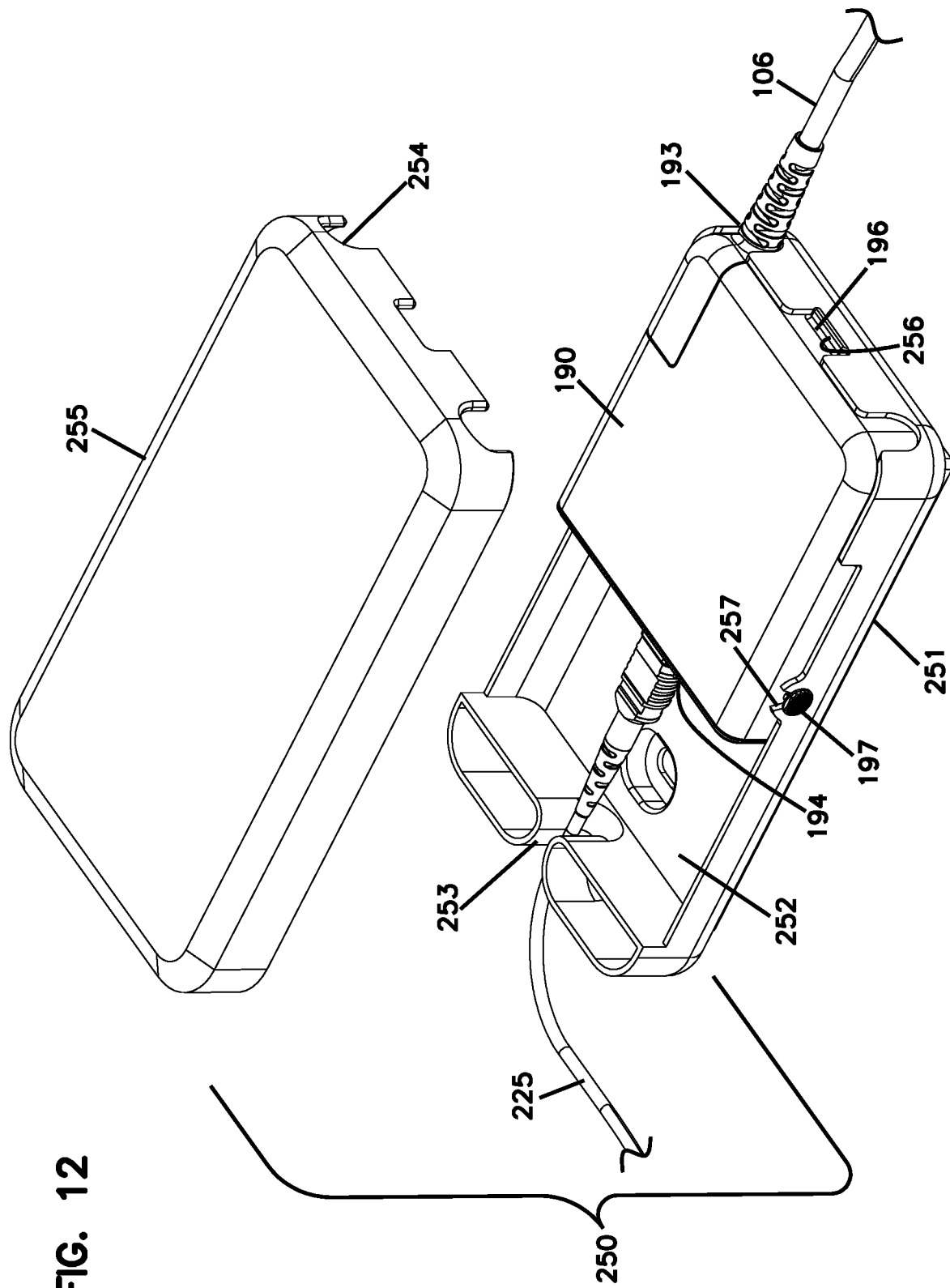
FIG. 12 is a perspective view of the splitter arrangement of any of FIGS. 4-8 disposed in a protective casing, a cover of the casing being exploded away from the splitter arrangement for ease in viewing.
Figure 13:
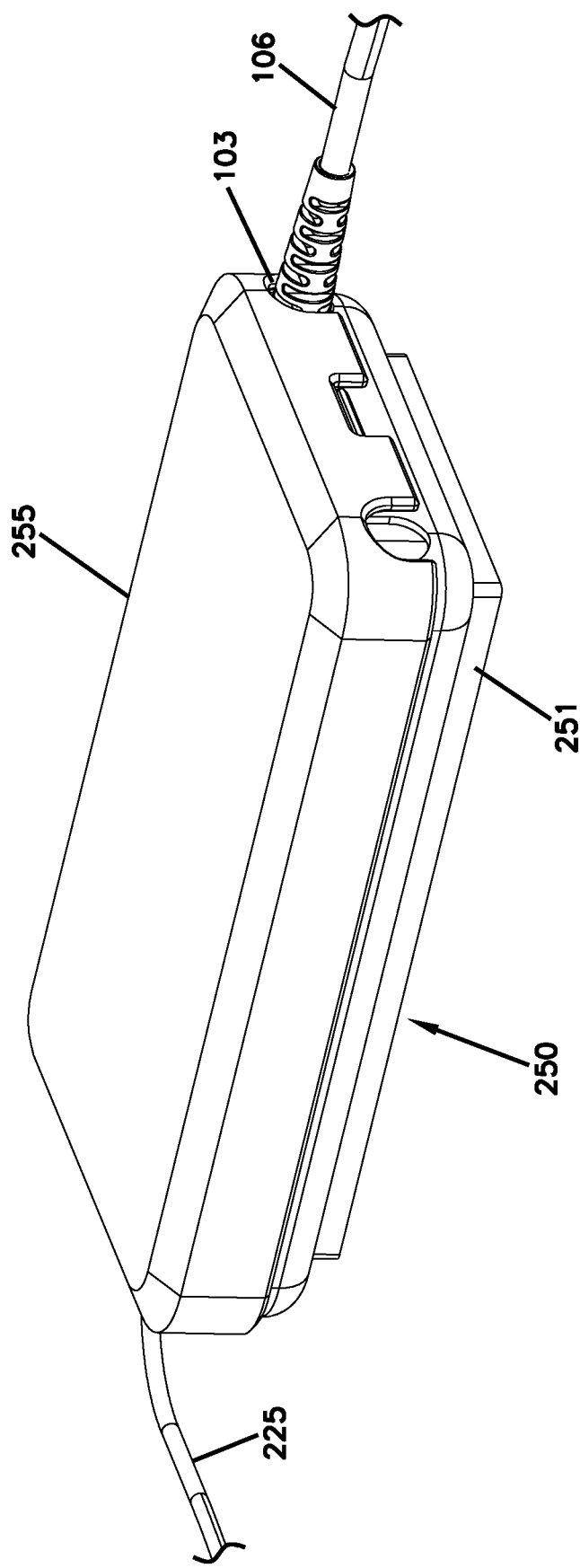
FIG. 13 is a top perspective view of the protective casing of FIG. 12 assembled around the splitter arrangement.
Figure 14:
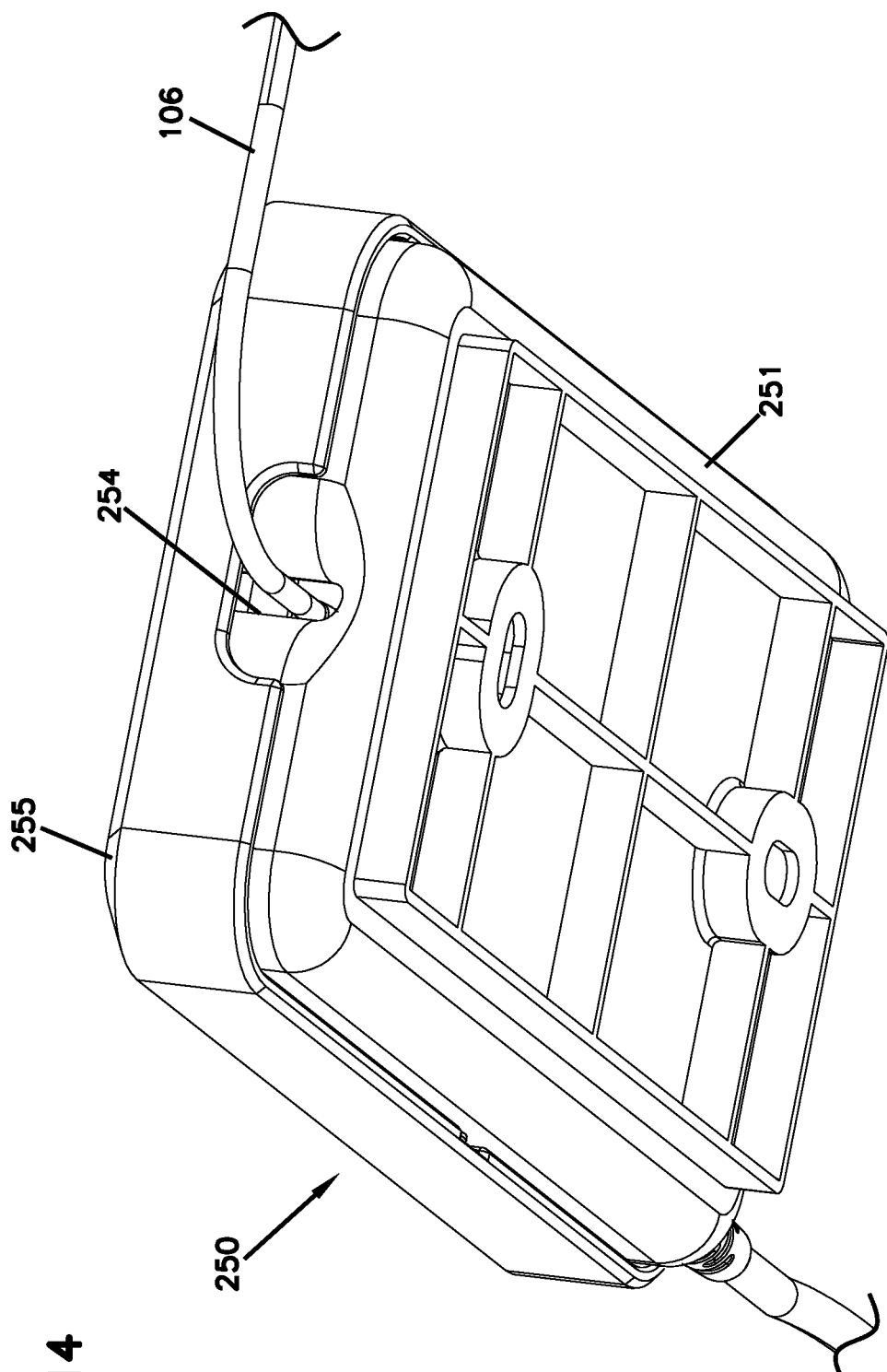
FIG. 14 is a bottom perspective view of the protective casing of FIG. 13.

FIGS. 12-14 illustrate an outer casing 250 suitable for use with the splitter arrangement 190. The outer casing 250 is configured to surround and hold the entire splitter arrangement 190. Accordingly, the outer casing 250 defines an interior 252 sized to hold the splitter arrangement 190 and to accommodate a multi-fiber connection between the output 104 of the splitter arrangement 190 and a multi-fiber cable. In some implementations, the casing interior 252 is sized to receive a connectorized end of a multi-fiber cable (e.g., cable 225 of a distribution terminal 220) and to providing sufficient space to manipulate the connectorized end towards a multi-fiber port defined at the output 104 of the splitter arrangement 190. In certain examples, the casing interior 252 may be sized to accommodate a boot or other strain relief of the multi-fiber cable.

In some implementations, the casing 250 includes a base 251 and a cover 255 that is removable from the base 251. The base 251 and the cover 255 cooperate to define a cavity in which the splitter arrangement 190 and the multi-fiber connection can be disposed. The base 251 and cover 255 also cooperate to define one or more input apertures 253 that align with the input(s) 103 of the splitter arrangement 190. The base 251 and the cover 255 also cooperate to define one or more output apertures 254 that align with output(s) 104 of the splitter arrangement 190.

In certain implementations, the cover 255 can be releasably locked to the base 251. For example, the cover 255 and base 251 may define fastener apertures aligned with each other when the cover 255 is mounted to the base 251 in the closed configuration. A fastener (e.g., a screw) can be inserted through the apertures to hold the cover 255 to the base 251. In other implementations, the cover 255 can latch to the base 251 (e.g., with accessible latching structures).

In certain implementations, the casing 250 includes alignment members that receive or engage alignment members of the casing 250. For example, the casing 250 may define a notch 256 sized to receive a tab 196 or other structure of the splitter arrangement 190. In another example, the casing 250 may define notches 257 configured to receive pins 197 or other projections from the splitter arrangement 190. In other examples, the splitter arrangement 190 could define the notches and the casing 250 could define inward projections.

In some implementations, the base 251 is configured to mount to a surface. For example, the base 251 may define one or more apertures through which fasteners may extend.

Figure 15:
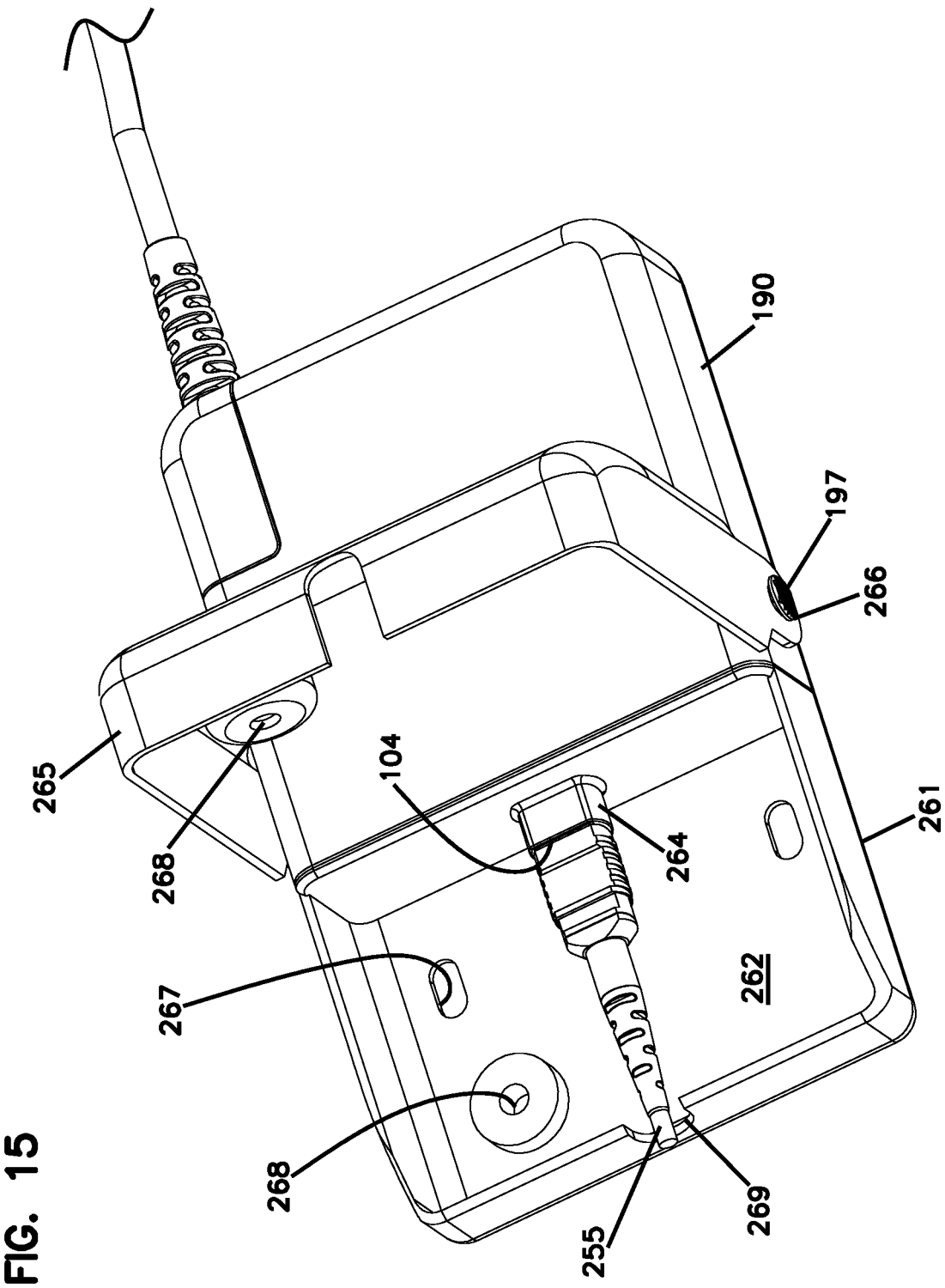
FIG. 15 is a top perspective view of the splitter arrangement of any of FIGS. 4-8 disposed in another protective casing, a cover of the casing being pivoted to an open position ease in viewing.
Figure 16:
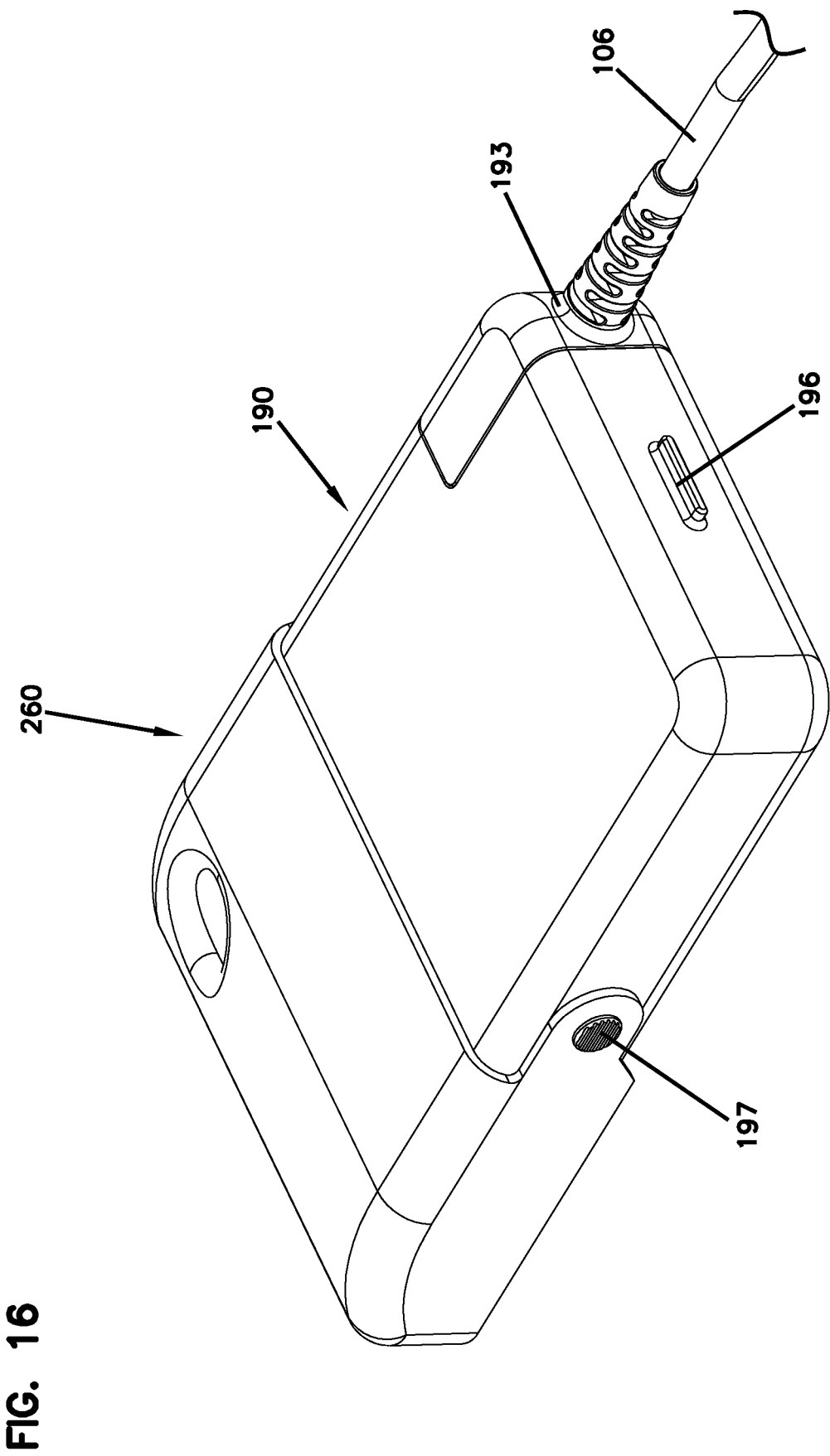
FIG. 16 is a top perspective view of the protective casing of FIG. 15 with the cover pivoted to a closed position to protect the connection.

FIGS. 15 and 16 illustrate another outer casing 260 suitable for use with the splitter arrangement 190. The outer casing 260 does not fully enclose the splitter arrangement 190. Rather, the outer casing 260 encloses the multi-fiber connection between the output 104 of the splitter arrangement 190 and a multi-fiber cable. The outer casing 260 defines an interior 262 sized to hold the multi-fiber connection. In some implementations, the casing interior 262 is sized to receive a connectorized end of a multi-fiber cable (e.g., cable 225 of a distribution terminal 220) and to providing sufficient space to manipulate the connectorized end towards a multi-fiber port defined at the output 104 of the splitter arrangement 190. In certain examples, the casing interior 262 may be sized to accommodate a boot or other strain relief of the multi-fiber connector. In other examples, the casing interior 262 is sized to receive a female, multi-fiber port terminating the multi-fiber cable. In still other examples, the casing interior 262 is sized to receive a multi-fiber optical adapter and a connectorized end of the multi-fiber cable.

In some implementations, the casing 260 is an integral part of the splitter arrangement 190. In other implementations, the casing 260 is fixedly mounted to the splitter arrangement 190. In certain implementations, the casing 260 is configured to mount to a periphery of the splitter arrangement 190 at the output 104. In certain implementations the casing 260 at least partially forms the output 104 of the splitter arrangement 190.

In some implementations, the casing 260 includes a base 261 and a cover 265 that is movable (e.g., pivotable, slideable, etc.) relative to the base 261. The base 261 and the cover 265 cooperate to define the cavity 262 in which the multi-fiber connection can be disposed. The base 261 and the cover 265 also cooperate to define one or more cable apertures 269 that align with output(s) 104 of the splitter arrangement 190 to enable the multi-fiber cable to enter/exit the casing 260.

In certain implementations, the base 261 mounts to the periphery of the splitter arrangement 190 at the output 104. In certain examples, the base 261 partially forms a multi-fiber optical adapter (e.g., forms the exterior port of the multi-fiber optical adapter). In certain examples, the base 261 forms an inwardly extending projection 264. In some examples, the inwardly extending projection 264 holds part of a multi-fiber optical adapter. In other examples, the inwardly extending projection 264 holds at least part of a multi-fiber connector.

In certain implementations, the cover 265 pivots relative to the base 261. In some examples, the cover 265 pivotally attaches to the base 261. In other examples, the cover 265 pivotally attaches to the splitter arrangement 190 and is movable relative to the base 261. For example, the cover 265 may include pivot notches 266 that fit over pins 197 defined by the splitter arrangement 190. (Alternatively, the cover 265 could include the pins and the splitter arrangement could define the notches.)

In certain implementations, the cover 265 can be releasably locked to the base 261. For example, the cover 265 and base 261 may define fastener apertures aligned with each other when the cover 265 is mounted to the base 261 in the closed configuration. A fastener (e.g., a screw) can be inserted through the apertures to hold the cover 265 to the base 261. In other implementations, the cover 265 can latch to the base 261 (e.g., with accessible latching structures).

In some implementations, the base 261 is configured to mount to a surface. For example, the base 261 may define one or more apertures 267 through which fasteners may extend.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A fiber optic network for a multi-dwelling unit, the fiber optic network comprising:
    a feeder cable;
    a distribution point located within the multi-dwelling unit, the distribution point receiving the feeder cable, the distribution point including a fiber optic splitter arrangement including a plurality of optical power splitters disposed within an interior of a housing, each optical power splitter having a separate splitter input and each optical power splitter having a plurality of splitter outputs, each of the optical power splitters being configured to split optical signals carried over a fiber received at the splitter input onto the respective splitter outputs, at least some of the outputs of at least two of the optical power splitters being terminated by a multi-fiber connector; and
    a plurality of fiber distribution terminals installed at respective floors within the multi-dwelling unit, the fiber distribution terminals being daisy-chained together and optically coupled to the multi-fiber connector at the distribution point.

2. The fiber optic network of claim 1, wherein all of the splitter outputs of the at least two of the optical power splitters are terminated at the multi-fiber connector.

3. The fiber optic network of claim 1, wherein the multi-fiber connector terminates at least some of the splitter outputs of all of the optical power splitters.

4. The fiber optic network of claim 1, wherein the housing of the fiber optic splitter arrangement defines an internal port at which the multi-fiber connector is received and an external port.

5. The fiber optic network of claim 4, further comprising a multi-fiber cable having a first end disposed at the external port to be optically coupled to the multi-fiber connector, the multi-fiber cable having an opposite second end received at a first of the fiber distribution terminals.

6. The fiber optic network of claim 5, wherein the multi-fiber cable extends from the first fiber distribution terminal.

7. The fiber optic network of claim 5, wherein the multi-fiber cable indexes the optical fibers between the first and second ends.

8. The fiber optic network of claim 1, wherein the distribution point includes a fiber distribution hub.

9. The fiber optic network of claim 1, wherein the distribution point includes a splice tray holding the splitter arrangement.

10. The fiber optic network of claim 9, wherein the feeder cable includes one or more optical fibers that are separated out and routed to a splice region of the splice tray, and wherein the splitter arrangement includes a plurality of input fibers extending from the splitter inputs of the optical power splitters to the splice region of the splice tray to optically couple to the optical fibers of the feeder cable.

11. The fiber optic network of claim 1, further comprising an outer casing configured to surround and hold the splitter arrangement.

12. The fiber optic network of claim 11, wherein the outer casing is sized to accommodate the splitter arrangement and a multi-fiber connection between the multi-fiber connector and a connectorized end of a multi-fiber cable.

13. The fiber optic network of claim 11, wherein the outer casing includes a base and a cover that is removable from the base.

14. The fiber optic network of claim 13, wherein the base and the cover also cooperate to define one or more input apertures that align with corresponding inputs defined in the housing of the splitter arrangement.

15. The fiber optic network of claim 13, wherein the cover is configured to be releasably locked to the base.

16. The fiber optic network of claim 1, wherein the distribution point includes an aggregation closure in which the splitter arrangement is disposed.

17. The fiber optic network of claim 16, wherein the splitter arrangement includes a first splitter arrangement; and wherein the fiber optic network further comprises a second splitter arrangement disposed at the multi-dwelling unit at a location spaced from the first splitter arrangement, and wherein the feeder cable is spliced to input fibers of the at least two splitter arrangements.

18. The fiber optic network of claim 17, wherein the daisy-chain of the fiber distribution terminals is optically coupled to the first splitter arrangement; and wherein a daisy-chain of another plurality of fiber distribution terminals is optically coupled to the second splitter arrangement.

19. The fiber optic network of claim 17, wherein the second splitter arrangement is disposed on a different floor than the first splitter arrangement.

20. The fiber optic network of claim 1, wherein the housing defines a non-enterable interior to which an input and an output are directly attached.

* * * * *